United States Patent [19]

Werkmeister et al.

[11] Patent Number: 4,557,165
[45] Date of Patent: Dec. 10, 1985

[54] ROD-SUPPLY ARRANGEMENT FOR AN AUTOMATIC LATHE

[76] Inventors: Johannes Werkmeister, Bahnhofstrasse 2, 6981 Collenberg; Ernst Tietz, Richard-Wagner-Strasse 11, 8761 Bürgstadt, both of Fed. Rep. of Germany

[21] Appl. No.: 515,798

[22] Filed: Jul. 21, 1983

[30] Foreign Application Priority Data

Sep. 10, 1982 [DE] Fed. Rep. of Germany ....... 3233692
May 28, 1983 [DE] Fed. Rep. of Germany ... 8315766[U]

[51] Int. Cl.$^4$ .......................................... B23B 13/10
[52] U.S. Cl. ......................................... 82/2.7; 414/18
[58] Field of Search ....................... 82/2.5, 2.7, 38 A; 414/14, 17, 18

[56] References Cited

U.S. PATENT DOCUMENTS

| 3,750,804 | 8/1973 | Lemelson | 214/16.4 |
| 3,802,603 | 4/1974 | Gordon | 82/2.7 |
| 3,890,860 | 6/1975 | Gordon | 82/38 A |
| 4,016,987 | 4/1977 | Stolzer | 214/16.4 |
| 4,049,173 | 9/1977 | Gomez-Alecha | 82/38 A |
| 4,100,827 | 7/1978 | Flemming | 414/18 |
| 4,421,446 | 12/1983 | Leon et al. | 414/17 |

FOREIGN PATENT DOCUMENTS

| 2350105 | 5/1974 | Fed. Rep. of Germany . | |
| 2407756 | 8/1975 | Fed. Rep. of Germany . | |
| 895273 | 5/1962 | United Kingdom | 414/18 |
| 1459373 | 12/1976 | United Kingdom | 82/38 A |

Primary Examiner—Leonidas Vlachos
Attorney, Agent, or Firm—Wood, Herron & Evans

[57] ABSTRACT

A rod-supply arrangement is described, comprising a guide tube containing oil and mounted in a support and a feed rod movable axially in the guide tube and coupled to a feed drive, the forward end of the feed rod carrying a rotatable coupling element, and also with an oil-supply pipe and an oil-return pipe. In order to obtain such an arrangement which requires little space and has a substantially simplified charging of the guide tube with always a new rod of material, in connection with which the stocking of the rods of material is not restricted to a prescribed number of existing guide tubes, provision is made for the guide tube to consist of a guide channel formed in the support and coupled with at least one oil-supply pipe and of an upwardly swingable cover extending throughout the length of the guide channel, oil being supplied through the oil-supply pipe during the feeding of the material rod in the closed guide tube of the guide channel.

14 Claims, 4 Drawing Figures

ROD-SUPPLY ARRANGEMENT FOR AN AUTOMATIC LATHE

The invention relates to a rod-supply arrangement for a guide tube containing oil and mounted in a support and a slide member which is movable axially in the guide tube and is coupled to a feed drive, the forward end of the said slide member carrying a rotatable coupling element, and also with an oil supply pipe and an oil return pipe.

For the feeding of automatic lathes processing rod-like material, it is known from German Offenlegungsschrift No. 29 19 780 to use an arrangement which comprises a guide tube situated behind the spindle of the lathe and in alignment with the latter. A rod of material to be processed by the lathe is accommodated in the guide tube and is advanced in controlled manner by a slide member movable longitudinally of the guide tube. In order to reduce the noise of rods of material rotating at high speed in the guide tube, provision is made for a certain quantity of oil to be present in the tube, the excess oil being able to emerge on the front side of the guide tube, which is not hermetically sealed. The feeding of oil to the guide tube is effected through a clearance between the slide member formed as a piston and the guide tube.

This arrangement has the disadvantage that a considerable amount of space is necessary for feeding the guide tube with a new rod of material. After the return travel of the slide member, the guide tube either has to be swung towards the side or be moved back to such an extent that a new rod of material can be introduced into the forward end of the guide tube. It has been attempted to simplify this involved feeding of the guide tube with a rod of material by replacing the guide tube by a magazine which is in the form of a drum and on the circumference of which are arranged several guide tubes charged with rods of material. However, this procedure is not only disadvantageous because the number of the material rods which can be accommodated is restricted by the dimensions of the drum, but it is also necessary to provide a corresponding number of guide tubes, of which always only one is in the operating position.

Moreover, for the flushing of the known guide tube with noise-damping oil, it is necessary for the internal width of the guide tube to be adapted to the largest diameter of the rod material to be processed. The consequence of this is that, for the supply of rods of material of different diameters, it is also necessary to have guide tubes of correspondingly different internal widths.

It is certainly known from German Offenlegungsschrift No. 23 50 105 to divide the guide tube longitudinally, it being possible for the upper part of the guide tube to be raised for lateral charging with a rod of material. With this arrangement, despite sound-damping measures, there is still always a considerable noise level, due to the rod of material rotating in the closed guide tube and advanced towards the automatic lathe and, with a noncircular cross-section, the internal contour of the guide tube becomes worn.

By means of the invention, a rod-supply means is to be provided which occupies little space and permits substantially more simplified feeding of the guide tube with a new rod of material, with which the stock of the rods of material is not restricted to a prescribed number of existing guide tubes.

For this purpose, the invention provides a rod-supply arrangement with a guide tube containing oil and mounted on a support and a feed rod which is movable axially in the guide tube and is coupled with a feed drive, and of which the forward end carries a rotatable coupling element, and also with an oil supply pipe and an oil return pipe, the guide tube consisting of a guide channel formed in the support and coupled with at least one oil-supply line and of an upwardly hingeable cover extending over the full length of the guide channel, oil being supplied through the oil supply line during the feeding of the rod of material in the closed guide tube to the guide channel.

The guide channel can consequently be permanently flushed by oil during the feeding of the rods of material, as a result of which the rotating rod, independently of its diameter and section, is automatically centred in the guide channel. Since in this case oil is always present between the rod of material and the inside wall of the guide channel, the degree of wear thereof and the development of noise are substantially reduced.

For the clean drainage of the oil discharging from the guide tube, it is possible in a further development of the invention to provide beneath the guide tube an oil-collecting trough which is connected to the oil return line.

The feeding of the guide tube, perhaps from one of the said appliances, is facilitated if, in a further development of the invention, a rod-storage platform is provided laterally on the support or stand, the opening of which platform into the guide channel is blocked when the cover is closed. When the storage platform or stage is formed of an entry ramp provided on the support and the lower part of the cover, a rod of material standing on the blocked supply platform drops automatically into the guide channel on opening the cover.

In a particularly preferred development of the invention, the support consists of an elongated section member, on which is positioned a plastic track, consisting for example of polyurethane, in which the guide channel is formed. The development of noise during the feeding of the rotating rod of material is reduced by the plastic track. A further reduction in the noise being developed is achieved if the cover consists of a frame section, beneath which is fixed another plastic track, possibly consisting of polyurethane, in the underside of which is formed a guide channel.

The section member may then be so formed that it encloses an oil-supply passage and an oil-discharge passage beneath the plastic track, the oil-supply passage being coupled by way of several tapping ducts to the guide channel.

For reducing the noise, the section member may in addition be equipped with at least one elongated, closed chamber, which is filled with sound insulating material, for example sand.

For the particularly simple mounting of the arrangement, the support may consist of three laterally interconnected extruded section members, of which the outer section member encloses a chamber filled with sound insulating material, the middle section member comprises the oil-supply passage and oil-discharge passage and on which is mounted the plastic track, and the third section member carries the link for the guide member of the feed rod. The cover can then have fixed thereon at least one lever which is pivoted on the machine frame and with the arm of which is coupled a rocker drive, perhaps in the form of a piston-cylinder unit fixed on the machine frame.

The invention is hereinafter described in detail with reference to the constructional examples shown in the accompanying drawing, wherein.

Figure 1:
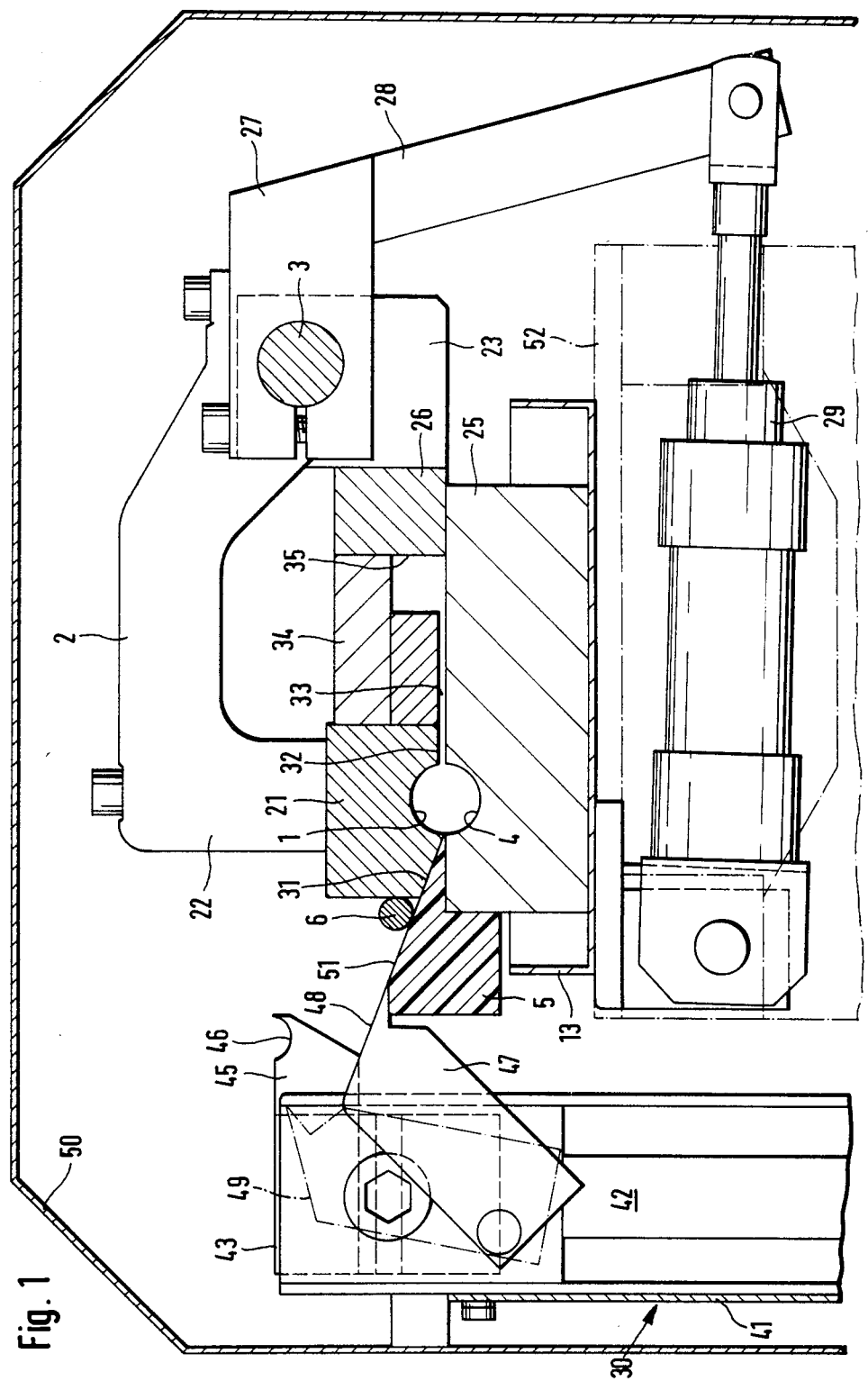
FIG. 1 is a diagrammatic section through the upper part of a rod-feeding arrangement.

On a stand (not shown), the rod-supply arrangement is mounted behind an automatic lathe and has a length of several meters perpendicularly of the cross-sectional views shown in the drawing and corresponding respectively to a rod of material to be fed to the automatic lathe. Mounted before the rod-supply arrangement on the operating side, which corresponds in the Figures to the left-hand side, is a rod-feeding apparatus 30, for example of a constructional form as known from Offenlegungsschrift No. 23 50 105, of which only the upper part is indicated in FIG. 1. The rod-supply arrangement and the upper part of the rod-feeding apparatus are covered with a hood 50.

Figure 2:
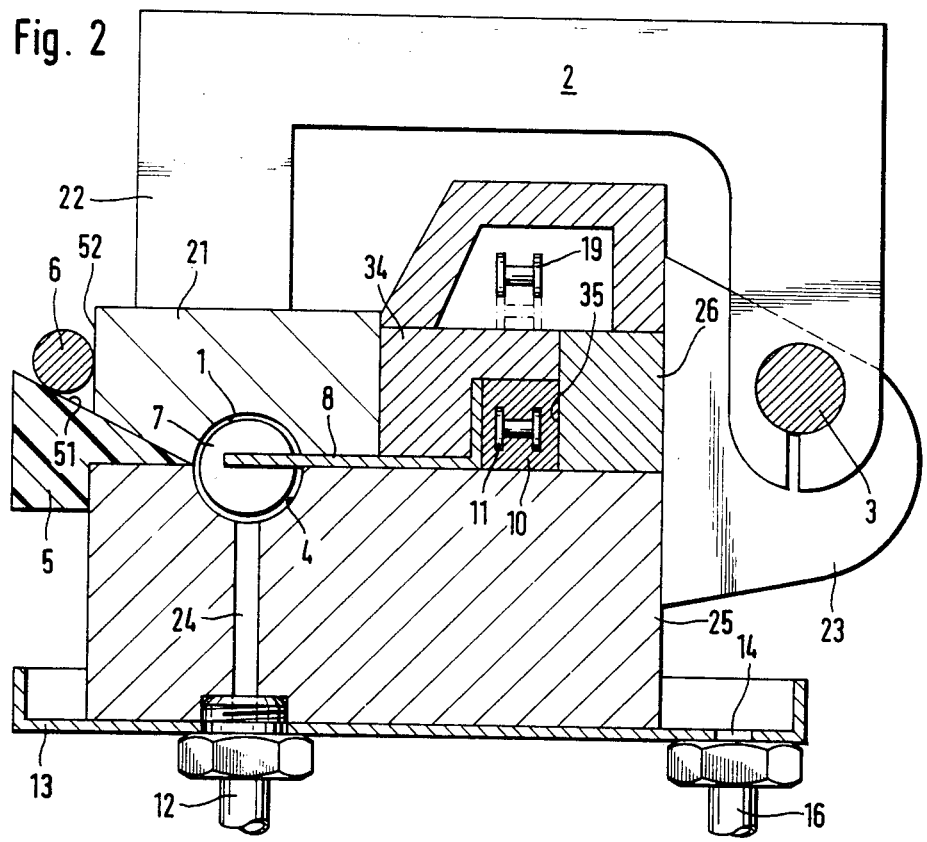
FIG. 2 is a diagrammatic section of essential parts of FIG. 1.

In detail, the rod-supply arrangement according to the first constructional form of the invention comprises a support 25 which is mounted on a stand 52 shown in broken lines and in the surface of which is formed a guide track 4 which is approximately semi-circular in cross-section and which serves for a rod 6 of material. As shown in FIG. 2, at least one oil-supply passage 24 extending from below through the support 25 opens into the guide channel 4 and is continued in a downward direction in an oil-supply pipe 12. The oil-supply pipe 12 is connected to an oil-storage container and an oil-supply pump (not shown). A discharge opening 14 of the oil-collecting tank 13 fitting beneath the support 25 is coupled to an oil-return line 16 leading back into the oil-supply container.

Fixed on that side of the support 25 which is at the rear relatively to the operating side and by means of a connecting member 26 are several projections 23 which are spaced longitudinally and in the aligned bores of which is rotatably mounted a rockable shaft 3. Fixed on the shaft 3 so as to be rotatable therewith is a rocker arm 27, of which the free end 28 located beneath the shaft 3 is coupled with an oscillating motor indicated generally at 29, which motor may be a piston-cylinder unit fixed in the stand 52 beneath the support 25, as indicated in FIG. 2. On the other side, the shaft 3 is fixed for rotation with several stirrup members 2 which are spaced longitudinally of the rod-feeding device and of which each is extended arcuately over the support 25 to the operating side and above the guide channel 4 and is connected at the end of a section 22 extending downwardly towards the guide channel 4 with a cover 21 extending longitudinally of the rod-supply arrangement.

The underside of the cover 21 facing the support 25 consists of three sections. The front section 31, facing the operating side, is formed with an inclined surface extending forwardly and upwardly for bearing in a flat position on a charging platform 5, which has still to be explained and which is formed with an inclined entry ramp 51. The middle section of the cover 21 is channelled out on its underside in the form of an elongated channel 1, which is of approximately semi-circular cross-section in the example as illustrated and is aligned with the guide channel 4 when the stirrup member 2 is lowered. The passage 1 and guide channel 4 together form a guide tube, in which the rod 6 of material engaged from the rear by the feed rod 7 is pushed into the automatic lathe (not shown). The rear section 32 of the cover 21 extends approximately parallel to the surface of the support 25, but is held spaced from the latter when the cover is closed in such a way that a longitudinal slot 33 remains, to which reference is still to be made. Extending from the rear side of the cover 21 and as far as the connecting element 26 is an intermediate element 34 connected to the latter. The intermediate element 34, the connecting element 26 and the top of the support 25 define a guide channel 35 in which a guide block 10 connected fast to a chain 11 is movable parallel to the guide tube. According to FIG. 2, a wing 8 extends from the guide block 10 through the longitudinal slot 33, which wing is connected to the feed rod 7. Consequently, with its movement within the guide channel 35, the guide block 10 carries with it the feed rod 7 which is connected to it by the wing 8. The endless chain 11 travels around a chain wheel arranged at the forward end of the guide channel 35 and an additional chain wheel arranged at the rearward end of the guide channel 35, it being possible for the upper run 19 of the chain 11 to be encased above the intermediate member 34, as shown in FIG. 2. Coupled to one of the chain wheels around which the chain 11 revolves is a driving motor (not shown) which is controlled in a manner known per se for the advancing and retraction of the feed rod 7.

Fixed on the front side of the support 25 are at least two charging or supply platforms 5 which are spaced apart longitudinally of the support 25 but of which only one is shown in the drawing, the said platforms comprising on their upper side a discharge ramp 51 which projects forwardly and is directed from the front forwardly and obliquely into the guide tube. According to FIGS. 1 and 2, with the guide tube closed, the sloping bottom surface of the front cover section 31 rests on the inner section of the discharge ramp 51, so that no oil can escape forwardly from the guide tube which is charged with oil. It is obviously within the scope of the invention to provide a one-part charging platform 5, which extends over the full length of the guide tube.

In the constructional example as illustrated, the rod-loading device 30 has several posts 41 which are spaced longitudinally of the rod-supply arrangement and of which each is equipped with a centrally driven chain hoist 42, which is shown diagrammatically. Fixed on the chain hoist 42 are several spaced lifting tables 43, each of which projects beyond the posts 41 towards the rod-supply arrangement by means of a projection 45, of which the front, upper end can be provided with a channel 46. In addition, several spaced entry flaps 47 are so pivoted on the post 41 between the lifting tables 43 that, in the rest position, they rest on the charging platform 5, the top surface 48 of each flap 47, continuing the slope 51 in an outward direction, intersecting the direction of the vertical upward movement of the projections 45 of the lifting tables 43. By means of a retraction device (not shown) which temporarily becomes operative during the upward movement of the lifting tables 43, the entry flaps 47 are swung into the position 49 which is shown in broken lines, in order to make available the path in an upward direction of a rod 6 which is resting in the groove 46. When the projection 45 of the lifting table 43 has passed the entry flap 47 in an upward direction, this latter drops on to the front end of the entry platform 5, as shown in full lines in FIG. 1. With the downward movement of the lifting table 43, a rod of material which is in the channel 46 is consequently supported by the surfaces 48 of the entry flaps 47 and rolls on these latter over the entry ramp 51 until it is resting against the forward section 31 of the cover 21.

Before raising the cover 21, the oil pump is so reversed that the oil which is contained in the guide tube is able to discharge by way of the oil-discharge pipe 16 until no oil is able to discharge laterally from the guide channel 4 when the cover 21 is opened. After actuation of the piston-cylinder unit 29, the cover 21 is swung upwardly for the opening of the guide tube, so that the rod 6 which is shown in the Figures is able to roll into the guide channel 4. After closing the cover 21, by appropriate actuation of the piston-cylinder unit 29, that end of the rod 6 which is further from the automatic lathe is gripped in a manner known per se by a gripper device and connected fast in rotation with the rotatable coupling part of the feed rod 7. By forward movement of the feed rod 7, that end of the rod which is adjacent the automatic lathe is then fed into the latter, oil is introduced into the closed guide tube and the rod is given the speed of rotation necessary for the machining thereof in the automatic lathe. The oil which is contained in the guide tube is entrained by the rapid rotation of the rod, so that, during the feeding of the rotating rod in the guide tube, a film of oil is developed between the rod and the inside wall of the guide channel 4 and also the channel 1, the said rod of material being automatically centred in the side oil film. Consequently, the rotating rod of material does not come into contact with the guide channel 4 and the channel 1.

This automatic centring of the rod of material in the guide tube is established both with rods which are very thin relatively to the diameter of the guide tube and also with such rods of material which almost completely fill the cross-section of the said tube. Because of the rotation of the rod in the oil bed, consequently only a small noise level is established and, because of the oil film completely surrounding the rotating rod of material, the latter is not able to cause any wear on the inside wall of the guide tube. The guiding of the feed rod 7 outside the guide tube in the channel 35 also provides the possibility of one and the same feed rod being used for rods of material having different diameters. Consequently, it is unnecessary for the diameter of the feed rod to be adapted to the internal dimension of the guide tube.

Figure 3:
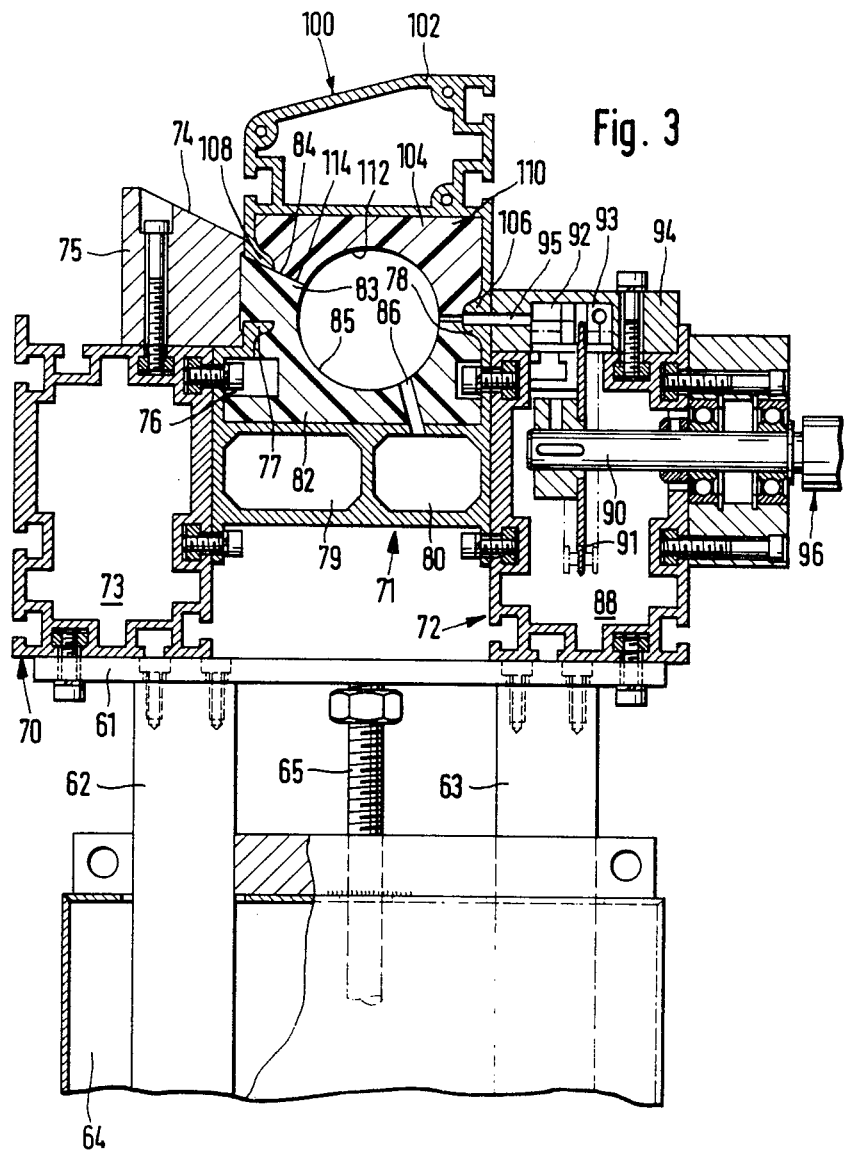
FIG. 3 is a cross-section of a second embodiment of the invention.
Figure 4:
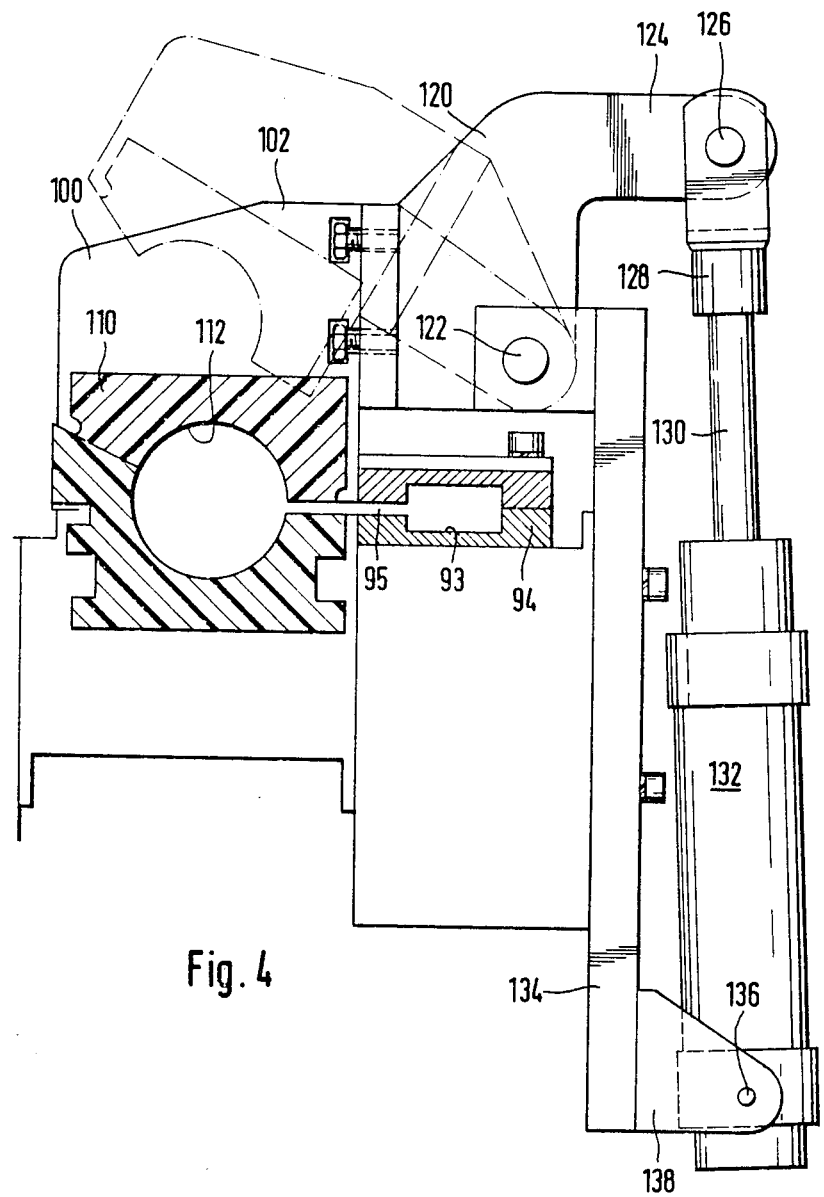
FIG. 4 is a diagrammatic view for explaining the pivotal movement of the cover.

The constructional form of the rod-supply arrangement according to the invention, as shown in FIGS. 3 and 4, is fixed on a table plate 61, which is mounted on solid supports 62,63. The table plate 61 is adjustable in height relatively to the base 64 by means of several spindles 65.

The support consists of three extruded section members 70,71,72, which are arranged laterally adjacent one another and are bolted together. The said section members 70,71,72 are extended at least over the entire length of a rod of material which is to be processed. The outer, front section member 70 defines a chamber 73, which can be filled with insulating material, for example sand. The section member 70 is bolted to the top of the table 61. Screwed on to the top side of the front section member 70, and set back slightly, is an elongated member 75 which is trapezoidal in cross-section and which serves as a charging platform, the top thereof comprising a rearwardly and downwardly sloping, flap entry ramp 74 for a rod of material, which is not shown.

Screwed on to the back of the front extruded section member 70 is the middle section member 71, which comprises, in an upper section, a U-shaped, upwardly open passage 76 having inwardly directed projections 77,78 at the upper end. Formed in juxtaposition beneath the passage 76 are two passages 79,80 which are of closed cross-section and of which the front passage 79 is able to serve as an oil-return passage and the rear passage 80 as an oil-supply passage. In a manner which is not illustrated, the said passages 79 and 80 are connected by way of oil pipes to an oil-supply container and an oil pump. Fitted into the U-section passage 76 are several moulded plastic blocks which are of the same shape and are positioned joining one another longitudinally, the said blocks consisting of polyurethane and one of these blocks 82 being shown in section in FIG. 3. The moulded block 82 is retained in the U-section passage 76 by the projections 77,78. On its front side, the block has a ridge 83 which extends above the front projection 77 and which ends at the top in a flat entry surface 84 which is directed rearwardly and downwardly and which bears from beneath against the entry ramp 74 and is directed towards the centre line of the supply tube. On the rearward side, the moulded block 82 terminates at the surface of the rear projection 78. Formed between the ridge 83 and the rear portion of the moulded block 82 is a channel 85 which is made arcuate in cross-section. From the oil-supply passage 80, several tapping passages or holes 86 spaced apart over the length of the arrangement extend through the said blocks 82 into the channel 85. Since the channels 85 of all moulded blocks 82 are in alignment, they form together the lower part of a supply tube for a rod of material.

The rear section member 72 defines a passage 88 into which, both at the end facing the automatic lathe and also at the rearward end, projects a shaft 90 having a chain wheel 91 keyed thereon. The chain, not shown in detail, runs around the two chain wheels 91, and in this constructional example of the invention, the bottom run of the chain extends freely through the passage 88. Connected to the upper run of the chain is a guide member 92, which is displaceable parallel to the guide tube in a link member 93 of an attachment 94 screwed on to the upper side of the rear section member 72. A longitudinal slot 95 for the vane connected to the guide member 92 at one end and to the feed rod at the other end extends longitudinally through that part of the member 94 which adjoins the rear side of the middle section member 71. One of the shafts 90 is driven by an electric motor 96 flanged on the rear side of the rear section member 72.

The cover 100 consists of an additional section member 102, on the underside of which is formed a downwardly open channel 104 which is U-shaped in cross-section. An inwardly directed rear projection 106 and an inwardly directed front projection 108 anchor in the passage or channel 104 several elongated plastic shaped blocks which consist of polyurethane and are fitted adjacent one another in a longitudinal direction, of which the block 110 is shown in section in FIG. 3. A passage 112 which is semi-circular in cross-section is formed from the underside in each block 110 in the direction towards the groove 85, which passage terminates towards the rear and at the bottom with the rear projection 106 and merges at the front end into an inclined surface 114. With the closed guide tube defined by the passages 112 and channels 85, the front inclined surfaces 114 of the blocks 110 rest with the underside of the front projections 108 superficially on the entry surface 84 of the blocks 82.

FIG. 4 shows the construction of the cover 100 in diagrammatic form, those parts of the arrangement which are unnecessary for understanding the movement of the cover having been omitted. The cover 100 is fixed on a shaft 122 by means of several arms 120 projecting rearwardly and spaced apart longitudinally, at least one of the rearward arms 120 having fixed thereon a lever 124 which is extended relatively to the shaft 122 towards the side facing away from the cover 100. A pin or journal 126 is fitted into a bore in the lever 124 at the rearward end, the forked end 128 of a piston 130 being linked to said journal. The piston 130 belongs to a driving motor, which comprises an oil or compressed air cylinder 132. The shaft 122 is mounted on the respective upper ends of several spaced posts 134, which are connected to the table 61 or to the supports 63. The cylinder 132 is linked at 136 on a lateral flange 138.

As will be immediately seen from FIG. 4, it is possible, by actuating the piston-cylinder unit 130,132, for the cover 100 to be swung upwardly from the position shown in full lines and closing the guide tube into the position indicated in broken lines, as a result of the piston 130 moving into the cylinder 132, the cylinder 132 carrying out a slight pivotal movement about its bearing 136.

The manner in which the arrangement according to FIGS. 3 and 4 operates is similar to that of the constructional example of the invention which is shown in and explained by reference to FIGS. 1 and 2. The particular advantage of this embodiment is the light method of construction, since the extruded section members 70,71,72,102 can be produced from extruded light metal sections. Furthermore, the section members 70,71,72,102 are to be easily fitted, which substantially facilitates the replacement thereof in the event of damage or maintenance work. To be emphasised in connection with this embodiment of the invention are particularly the plastic moulded blocks 82 and sectional blocks 110, since it is possible for a noise-insulating material, for example polyurethane, to be chosen for these blocks. Since the advanced, rotating rod of material is automatically centred in the guide tube flooded with oil, any damage to the internal contour of the guide tube, that is, of the channels 85 and the passages 112, is not to be feared, even when the rods of material have angular sections. Furthermore, the entry from the charging platform 75 is sealed off in oil-tight manner by the cover in operation, since the entry surface 84 is positioned against the entry ramp 74, the forward edge of the shaped part 102 bearing against the end of the discharge ramp 74, as shown in FIG. 3.

We claim:

1. A rod supply apparatus for advancing a rotatable rod of material comprising:
   a support having an elongated guide channel and an elongated surface adjacent said guide channel;
   a cover, swingably mounted on the support and extending over the full length of the guide channel, having means cooperating with said guide channel to define an elongated guide tube and including an elongated surface mating with the elongated surface of the support, when the cover is in a closed position;
   means for swinging the cover between (a) a closed position in which the cover cooperates with the elongated guide channel to define an elongated guide tube and the elongated surfaces of the cover and the support are in mating engagement and (b) an open position in which said elongated surfaces are spaced apart from one another and in which a rod of material to be advanced can be fed laterally into the guide channel;
   feed means adjacent the elongated surface of the support to feed a rod of material laterally toward the guide channel, the elongated surface of the support being positioned to receive a rod of material which is fed laterally from the feed means to support the rod of material for lateral movement into the guide channel, when the cover is in its open position;
   a feed rod movable axially in the elongated guide tube having a forward end carrying a rotatable coupling element connectable to a rod of material to be advanced by the rod supply apparatus;
   means on the support to move the feed rod axially in the elongated guide tube to advance a rod of material connected to the rotatable coupling element; and
   means connected to the support supplying oil to the elongated guide tube when the cover is in its closed position, so that upon rotation and advancement of a rod of material, oil contained in said guide tube is entrained by the rotation of the rod of material to form an oil film centering said rod in said guide tube, with the mating elongated surfaces of the cover and the support forming a seal to prevent lateral leakage of oil from said guide tube.

2. A rod supply apparatus as claimed in claim 1, said apparatus further comprising
   return oil means connected with said means supplying oil, said return means cooperating with said means supplying oil and said guide tube to establish a closed loop oil circuit.

3. A rod supply apparatus as claimed in claim 2, said apparatus further comprising
   an oil collecting container beneath said guide channel, said container being connected to said return oil means.

4. A rod supply apparatus as claimed in claim 1, said guide channel having an upwardly open cross-sectional configuration, and said cover having a downwardly open cross-sectional configuration facing said guide channel.

5. A rod supply apparatus as claimed in claim 1, said guide tube having a circular cross-section.

6. A rod supply apparatus as claimed in claim 1, said means to move the feed rod comprising
   a vane extending through a lateral longitudinal slot in said guide tube.

7. A rod supply apparatus as claimed in claim 6, said longitudinal slot being formed between said cover and said support.

8. A rod supply apparatus as claimed in claim 6, said means to move the feed rod comprising
   a guide block coupled with a chain drive, said block being guided in a line extending parallel to said guide channel, and said vane being connected to said guide block.

9. A rod supply apparatus as claimed in claim 1, said feed means further comprising
   a rod storage platform offset laterally from said guide channel, said platform opening onto the elongated surface of the support adjacent said guide channel when said cover is opened.

10. A rod supply apparatus as claimed in claim 9, said rod storage platform comprising
an oblique entry ramp fixed adjacent said guide tube, said ramp being sized to store plural feed rods.

11. A rod supply apparatus as claimed in claim 1, said guide channel comprising a first plastic track, and said cover comprising a second plastic track.

12. A rod supply apparatus as claimed in claim 11, said first and second plastic tracks being formed of polyurethane.

13. A rod supply apparatus as claimed in claim 10, said support having three section members connected one to the other, a first section member defining a chamber filled with insulating material, a second section member defining an oil supply passage and an oil discharge passage, and a third section member forming a link for a guide member for said feed rod.

14. A rod supply apparatus as claimed in claim 10, said means for swinging the cover comprising
a lever fixed to said cover, and
a rocker drive connected with said lever, said rocker drive being adapted to move said cover between the open and closed positions.

* * * * *